United States Patent
Miyazawa et al.

(10) Patent No.: US 6,921,600 B2
(45) Date of Patent: Jul. 26, 2005

(54) SEPARATOR FOR FUEL CELL AND METHOD OF MANUFACTURE THEREFOR

(75) Inventors: Atsushi Miyazawa, Yokosuka (JP); Toshihiro Takekawa, Yokosuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 134 days.

(21) Appl. No.: 10/332,949

(22) PCT Filed: Aug. 27, 2002

(86) PCT No.: PCT/JP02/08593
§ 371 (c)(1),
(2), (4) Date: Jan. 14, 2003

(87) PCT Pub. No.: WO03/030284
PCT Pub. Date: Apr. 10, 2003

(65) Prior Publication Data
US 2003/0235735 A1 Dec. 25, 2003

(30) Foreign Application Priority Data
Sep. 28, 2001 (JP) .................... 2001-299500

(51) Int. Cl.⁷ ............... H01M 2/14; H01M 2/02
(52) U.S. Cl. ............... 429/34; 429/38; 429/39; 429/26; 429/30; 429/129; 429/135; 429/143; 29/623.1
(58) Field of Search ............ 429/34, 38, 39, 429/26, 30, 129, 135, 143; 29/623.1

(56) References Cited

U.S. PATENT DOCUMENTS
6,544,680 B1 * 4/2003 Takano et al. ............ 429/34

FOREIGN PATENT DOCUMENTS
| | | | |
|---|---|---|---|
| GB | 2 359 186 A | 8/2001 | |
| GB | 2359186 A * | 8/2001 | ............ H01M/8/10 |
| JP | 6-333580 | 4/1995 | |
| JP | 8-138692 | 5/1996 | |
| JP | 2000-223131 | 8/2000 | |

* cited by examiner

Primary Examiner—Patrick Joseph Ryan
Assistant Examiner—Angela J. Martin
(74) Attorney, Agent, or Firm—McDermott Will & Emery LLP

(57) ABSTRACT

A separator (4) for a fuel cell (1a) is provided which allows effective use of heat generated in proximity to an electrolytic membrane (2) in order to melt frozen water in the gas diffusion electrodes (3a, 3b) of the fuel cell (1a). The separator (4) is provided with a plurality of projections (11) between which a gas flow passage (7a, 7b) on the surface of the separator (4) is formed and which make contact with the gas diffusion electrodes (3a, 3b). The coefficient of thermal conductivity of the projection (11) is smaller than the coefficient of thermal conductivity of other sections of the separator (4).

9 Claims, 5 Drawing Sheets

SEPARATOR FOR FUEL CELL AND METHOD OF MANUFACTURE THEREFOR

FIELD OF THE INVENTION

This invention relates to a fuel cell and a separator used in the fuel cell and to a method of manufacture therefor.

BACKGROUND OF THE INVENTION

In a conventional polymer electrolyte fuel cell (PEFC), fuel gas containing hydrogen and a gaseous oxidizing agent containing oxygen are respectively supplied to two gas diffusion electrodes (cathode and anode) sandwiching a polymer electrolytic membrane. The two gas diffusion electrodes and the polymer electrolytic membrane constitute a membrane electrode assembly (MEA). The gas diffusion electrodes are generally provided with a porous gas diffusion layer and a platinum catalytic layer. The gas diffusion layer is made from carbon and supports the catalytic layer. The platinum catalytic layer is connected to the electrolytic membrane. Gas which is supplied from the outside of the diffusion layer diffuses into the platinum catalytic layer through the diffusion layer. Reactions as shown in Equation (1) and Equation (2) occur at the electrodes and convert chemical energy into electrical energy.

  (1)

  (2)

In a PEFC, water is generated at the cathode as shown by Equation (2). Since the fuel gas must be humidified in order to facilitate the above reactions, moisture is also supplied to the anode which performs the reactions as shown in Equation (1) above. As a result, water is always present at the gas diffusion electrode. When the fuel cell has not reached a normal operating temperature, it is sometimes the case that water in the gas diffusion electrode impedes the supply of gas to the platinum catalytic layer. Therefore it is preferred that water in the gas diffusion electrode is discharged rapidly. Furthermore when the ambient operating temperature of the fuel cell is low, water in the gas diffusion electrode freezes. Thus prompt melting and discharge of water in the gas diffusion layer electrode is preferred.

Tokkai 2000-223131 published by the Japanese Patent Office in 2000 and Tokkai Hei 8-138692 published by the Japanese Patent Office in 1996 disclose a fuel cell provided with a hydrophilic membrane on the surface forming a gas flow passage. In this fuel cell, discharge performance is improved with respect to water produced in the passage as a result of the hydrophilic characteristics.

SUMMARY OF THE INVENTION

However in the prior-art fuel cell, it is difficult to ensure complete discharge of water at the gas diffusion electrode when the fuel cell is not operating. Consequently it is difficult to avoid freezing of water in the gas diffusion electrode at temperatures below freezing.

It is therefore an object of this invention to provide a separator disposed between the adjacent membrane electrode assemblies in a fuel cell stack, the separator having the function of facilitating melting of frozen water (ice) between the electrolytic membrane and the separator and the function of discharging the melted water from the gas diffusion electrode to the gas flow groove.

It is a further object of this invention to provide a method of manufacturing the separator.

In order to achieve above objects, this invention provides a separator for a fuel cell, the fuel cell having two separators and a membrane electrode assembly being sandwiched by the two separators, the membrane electrode assembly being provided with an anode electrode, a cathode electrode and an electrolytic membrane sandwiched by the two electrodes, each of the two electrodes having a diffusion layer allowing diffusion of one of a gaseous oxidizing agent and fuel gas. The separator comprises a plate-like member; and a plurality of projections for forming a plurality of gas passages which allow flow of one of the gaseous oxidizing agent and fuel gas, the projections being provided on the plate-like member and making contact with the membrane electrode assembly. One of the gas passages is defined by two adjacent projections, the plate-like member and the membrane electrode assembly. Further a coefficient of thermal conductivity of the projection is smaller than a coefficient of thermal conductivity of the plate-like member of the separator.

Furthermore, this invention provides a method of manufacturing a separator for a fuel cell, the fuel cell having the separator provided with a plate-like member and a plurality of projections on the plate-like member, the projections making contact with an electrode of the fuel cell, wherein a gas flow groove is formed between two adjacent projections and extends parallel to a surface of the separator. The method comprises forming the projections from a material having a lower coefficient of thermal conductivity than a coefficient of thermal conductivity of the plate-like member; forming a membrane from a hydrophilic electrically-conductive coating applied to the surface of the projections and the surface of the plate-like member; and removing the membrane from a top of the projections which makes contact with the electrode of the fuel cell by grinding the surface on the top of the projections or by applying a blasting process after filling the gas flow groove with a liquid medium or a gel medium.

A separator according to this invention has a plurality of projections each making contact with one electrode and has a low coefficient of thermal conductivity. Thus heat which is generated in proximity to the electrolytic membrane of the fuel cell remains localized. Consequently, heat generated in proximity to the electrolytic membrane can be effectively used in order to melt frozen water in the gas diffusion electrode. Furthermore this melted water can be rapidly discharged from the gas diffusion electrode to the gas flow groove.

The details as well as other features and advantages of this invention are set forth in the remainder of the specification and are shown in the accompanying drawings.

BRIEF DESCRIPTION OF THE DRAWINGS

In order to clarify the figures, several members have been colored black or gray. In the figures, similar elements have similar reference numerals.

DESCRIPTION OF THE PREFERRED EMBODIMENTS

Figure 1:
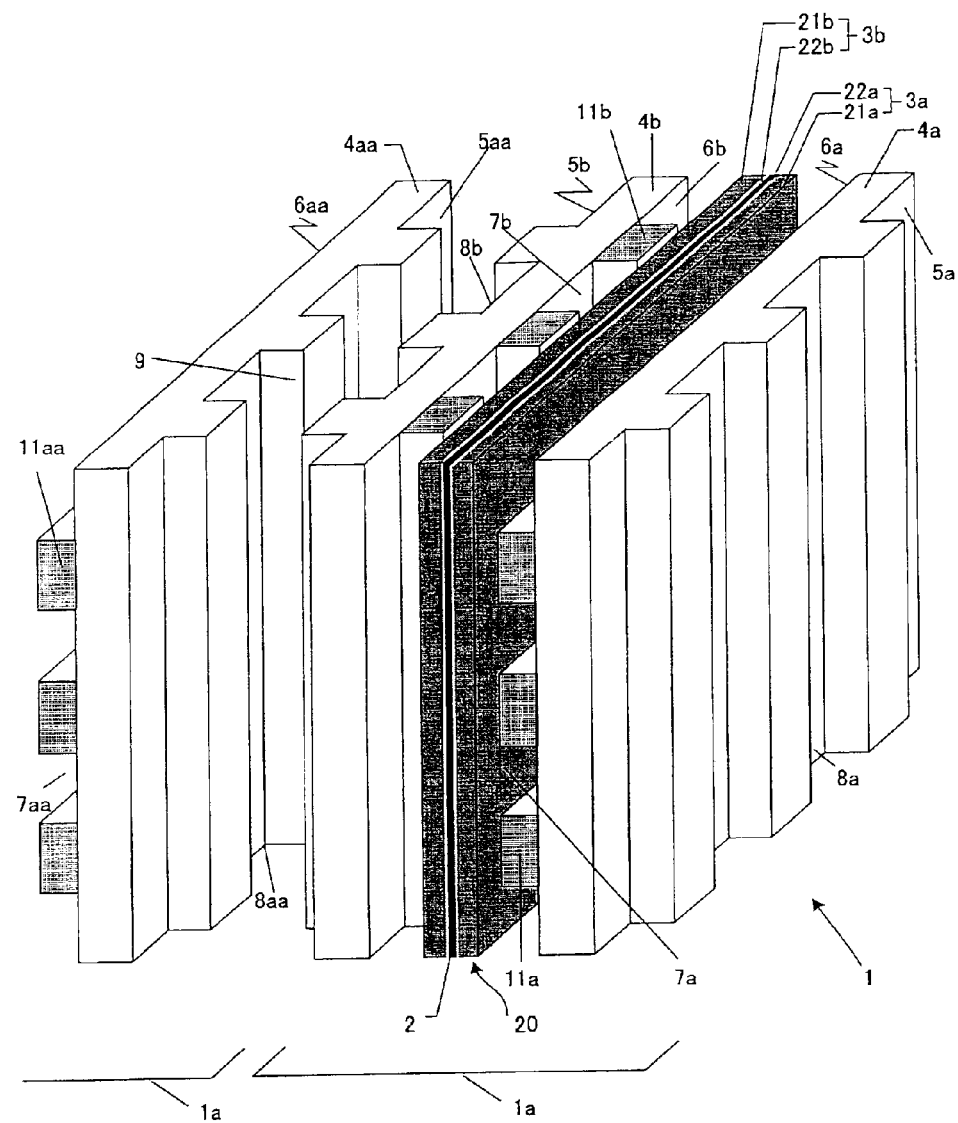
FIG. 1 is a schematic partial perspective view of a fuel cell stack according to this invention.

Referring to FIG. 1, the structure of a fuel cell stack 1 used in this embodiment will be described.

A fuel cell stack 1 is provided with a plurality of unit cells 1a placed in series. The unit cells 1a are provided with electrolytic membrane 2, two electrodes 3a, 3b and two separators 4a, 4b. The electrolytic membrane 2 is formed from a solid polymer. The plate-shaped anode electrode 3a and cathode electrode 3b are disposed to sandwich the electrolytic membrane 2. The electrodes are gas diffusion electrodes which are provided with a thin platinum catalytic layer (22a, 22b) connected to the electrolytic membrane 2, and a porous gas diffusion layer (21a, 21b) which supports the catalytic layer and is provided on the outer side of the catalytic layer. The platinum catalytic layer (22a, 22b) comprises a platinum catalyst supported on carbon carrier. The porous gas diffusion layer comprises carbon such as a carbon cloth or carbon paper, and is imparted with water repellent characteristics. The electrodes (3a, 3b) are provided with a gas diffusion layer (21a, 21b) in order to allow diffusion of supplied fuel gas or a gaseous oxidizing agent to the electrolytic membrane 2. Since the supplied fuel gas and the gaseous oxidizing agent disperse over the entire surface of the electrodes 3a, 3b, reactions occur uniformly in the fuel cell stack 1.

The electrolytic membrane 2 and the electrodes 3a, 3b comprise a membrane electrode assembly (MEA) 20. The two separators are formed substantially in the shape of a plate and comprise an anode separator 4a and a cathode separator 4b. The two separators sandwich the MEA 20.

A plurality of gas flow grooves 7a (7aa) extending in parallel in a horizontal direction in FIG. 1 are formed on the surface 6a (6aa) of the anode separator 4a (4aa) facing the anode electrode 3a. In this description, the projection which defines the gas flow groove 7a (7aa) is termed a rib 1 1a (11aa). The ribs 11a of the anode separator 4a (4aa) are disposed at equal intervals. Fuel gas required for generating power is allowed to flow in the gas flow groove 7a (7aa) in order to supply fuel to the anode electrode 3a.

On the other hand, a plurality of gas flow grooves 7b extending in parallel in a vertical direction in FIG. 1 are formed on the surface of the cathode separator 4b facing the cathode electrode 3b. The projection which defines the gas flow groove 7b is termed a rib 11b. The ribs 11b of the cathode separator 4b are disposed at equal intervals in the same manner as the ribs 11a. Gaseous oxidizing agent required for generating power is allowed to flow in the gas flow groove 7b and is supplied to the cathode electrode 3b. The gas flow groove 7a (7aa) supplying fuel gas is formed orthogonal to the gas flow groove 7b supplying gaseous oxidizing agent. However the invention is not limited in this respect and the passages may be formed parallel to one another.

In the anode electrode 3a using supplied fuel gas, the following reaction occurs.

$$H_2 \rightarrow 2H^+ + 2e^- \quad (1)$$

Electrons pass through an electric wire and a load (not shown) and reach the cathode electrode 3b. On the other hand, protons reach the cathode electrode 3b by passing through the electrolytic membrane 2. In the cathode electrode 3b, electrochemical reactions required for power generation are performed as a result of the following reaction between oxygen contained in the oxidizing agent and the supplied electrons and protons.

$$1/2O_2 + 2H^+ + 2e^- \rightarrow H_2O \quad (2)$$

The overall temperature of the cell 1a is increased as a result of the reactions (1) and (2) between the anode electrode 3a and the cathode electrode 3b.

A plurality of cooling grooves 8a, 8b (8aa) is optionally formed on the rear face of the separator 4a, 4b (4aa) opposite to the electrode side in order to cool the cell 1a. A cooling passage 9 is formed by assembling the cooling grooves 8a, 8b (8aa) in adjacent opposed cells. For example, one cooling passage 9 is formed from the cooling grooves 8b, 8aa respectively placed on the surface of the cathode separator 4b in the cell 1a and the anode separator 4aa in the adjacent cell 1a. The cooling passages 9 are formed in parallel and at equal intervals on the surface of the separator 4a, 4b (4aa). A cooling medium is introduced into the cooling passage 9 in order to cool the fuel cell stack 1.

Figure 2:
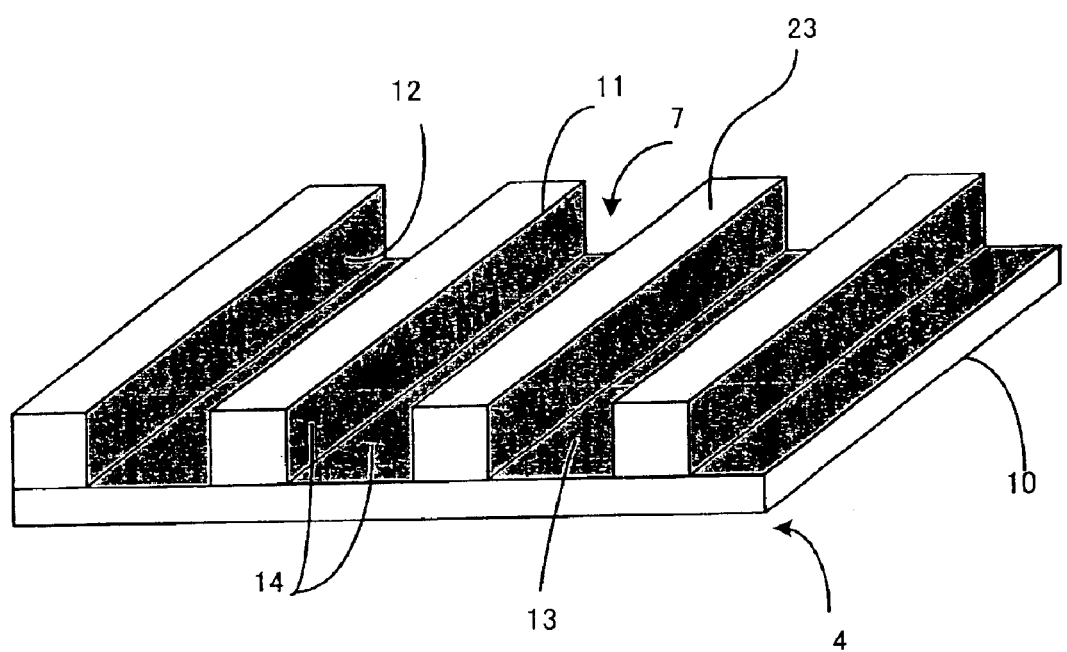
FIG. 2 is a schematic perspective view of a separator according to a first embodiment.

Referring to FIG. 2, a separator 4 used in the fuel cell stack 1 will be described. In FIG. 2, the illustration of the cooling grooves is omitted.

In this separator 4, rectangular parallelepiped ribs 11 are disposed in parallel on a plate 10 (or a plate-like member) at equal intervals on the surface of the plate 10. The ribs 11 are projections projected from the plate 10 for forming the plurality of gas passages which allow flow of one of the gaseous oxidizing agent and fuel gas. The top face 23 of the rib 11 makes contact with the anode or cathode electrode. A hydrophilic membrane 14 is formed on the bottom 13 and on both wall faces 12 of the gas flow groove 7 formed between the ribs 11 disposed in the above manner.

The ribs 11 are formed from a material which has a lower coefficient of thermal conductivity than the material constituting the plate 10. Since the coefficient of thermal conductivity of the ribs 11 is lower than the material constituting the plate 10, heat produced at the electrodes does not tend to diffuse through the separator from near to the top of the rib 11 which makes contact with the electrode. Consequently it is possible to use the heat generated at the electrodes to melt water which has frozen at low temperatures. As a result, when operating the fuel cell at low temperatures, water which has frozen in the gas diffusion electrode is melted. As described above, since water is produced in the cathode electrode 3b, this invention is applied at least to the separator 4b connected to cathode electrode 3b. Furthermore it is preferred that this invention is applied in the same manner to the separator 4a connected to anode electrode 3a as well. Since it is often the case that the fuel gas is supplied with the addition of water vapor, it is possible to apply this invention only to the separator 4a connected to anode electrode 3a in order to further improve the prevention of freezing of water resulting from condensation of added water vapor.

In the first embodiment, the porosity of the material forming the rib 11 is higher than that forming the plate 10. Generally since the separator 4 of the fuel cell stack 1 should display electrical conductivity, thermal resistance and acid resistance, a carbon composite or a metal component having an anti-oxidizing coating thereon are widely employed as the material forming the separator 4.

It is preferred that the material forming the rib 11 of the separator 4 in this embodiment comprises graphite or a carbon composite which allow relatively simple control of porosity. Such materials should not display large impediments to conductivity. A preferred method of forming the rib 11 comprises a step of molding a composite material from various types of resins and carbon powder or a step of graphitization comprising baking of a non-woven fabric impregnated with resin, due to their cost efficiency. Furthermore it is possible to form the rib 11 from graphite, perform a cutting operation to a predetermined size and arrange and attach the resulting rib 11 to the plate 10.

The effective porosity of the material constituting the rib 11 is set to 10–80%, preferably to 10–60% and even more preferably to 10–40%. At less than a porosity of 10%, it is not possible for the separator to provide a sufficiently heat insulating effect. At greater than a porosity of 80%, there is the possibility of damage during lamination of the separator 4 due to extreme weakening of mechanical strength. The dimensions of the pores may be varied in response to the width and depth of the gas flow groove 7. When the plate 10 is formed from the same material as the rib 11, the mechanical strength of the separator itself is reduced due to high porosity. Furthermore cooling performance during cooling operations is reduced due to the overall reduction in the coefficient of thermal conductivity of the separator 4. As a result, it is preferred that the plate 10 is not formed from the same material as the rib 11.

A hydrophilic membrane 14 is formed by coating a slurry or a coating containing a hydrophilic material onto only the bottom 13 and both wall faces 12 of the gas flow groove 7. In this embodiment, heat generated in proximity to the electrolytic membrane 2 is consumed by melting the frozen water in the gas diffusion electrode (electrodes 3a, 3b). In order to improve the initial power generation efficiency at low temperatures, it is preferred that residual frozen water in the electrode (3a, 3b) is discharged rapidly from the electrode (3a, 3b) to the gas passage. For this reason, the hydrophilic membrane 14 is formed only on the bottom 13 and both wall faces 12 of the gas flow groove 7. Since the hydrophilic membrane 14 facilitates discharge of melted water from the inside of the gas diffusion electrode into the gas flow groove 7, the water discharge performance of the electrodes (3a, 3b) is improved. In particular, when the gas diffusion layer (21a, 21b) of the electrodes (3a, 3b) has a water-repellent effect, the water discharge performance of the electrodes (3a, 3b) is further improved. Since the top face 23 of the rib 11 contacting to the MEA 20 is not provided with a hydrophilic membrane 14, it is possible to avoid reductions in porosity in the section connecting the separator 4 with the electrode (3a, 3b).

Figure 3:
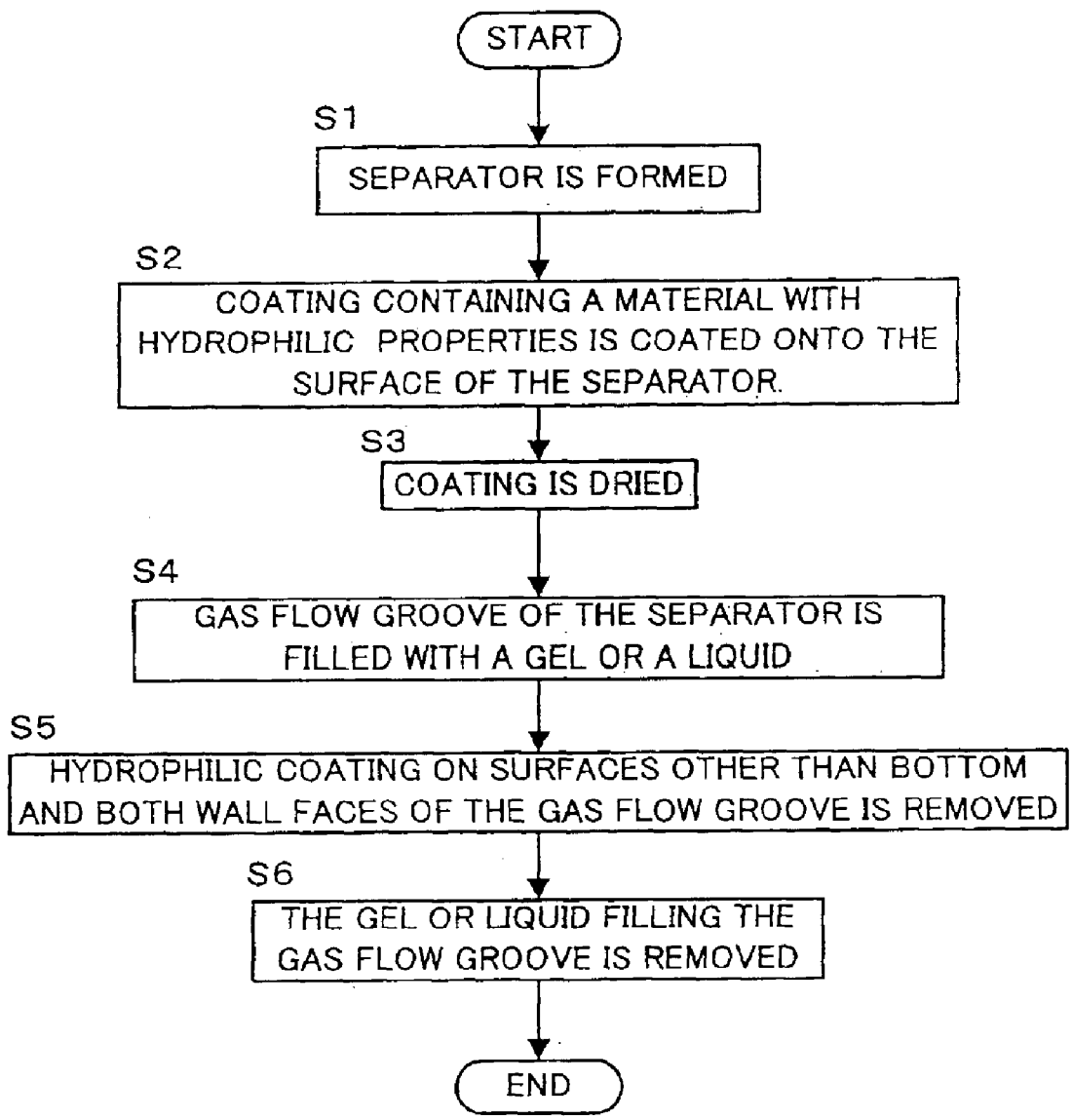
FIG. 3 is a flowchart showing a method of manufacturing a separator.

Referring to the flowchart in FIG. 3, a method of forming the separator 4 will be described below.

Firstly in a step S1, the separator 4 is formed. The separator 4 may be formed using a known method. For example, the separator 4 may be formed by cutting a gas flow groove 7 with a mechanical process into a graphitized plate 10 or by compression molding, injecting molding or extrusion molding of a composite material comprising carbon powder and various types of resin.

Then in a step S2, a coating containing a material with hydrophilic and electrical-conductive properties is coated onto the entire surface of the separator 4. The method of coating the surface of the separator 4 may include various known methods such as a spray method, a casting method or a dip coating method. A gentle abrasive process may be pre-applied to the surface of the separator 4 in order to ensure sufficient adhesion of the coating.

Then the routine proceeds to a step S3 wherein the coating is dried. The drying process for the coating can be performed using a known method such as natural drying, hot air drying or drying methods using various types of electromagnetic waves. In this manner, the hydrophilic membrane 14 is formed on the entire surface of the separator 4.

After forming the hydrophilic membrane 14 on the surface of the separator 4, the processes in the steps S4, S5 are performed to remove the hydrophilic membrane from surfaces other than the bottom 13 and both wall faces 12.

In the step S4, the gas flow groove 7 of the separator 4 is filled with a gel or a liquid in order to perform a masking operation on the bottom 13 and both wall faces 12 of the gas flow groove 7. Before gas flow groove 7 of the separator 4 is filled with gel or liquid, the gas inlet/outlet of the separator 4 is pre-sealed. In this manner, no leakage occurs even when the gas flow passage 7 is filled with gel or liquid. It is preferred that a jig is used which is adapted to the gas inlet/outlet and the shape of the separator 4. Water is preferred as a liquid for filling the groove 7 due to cost considerations. However another liquid medium or a liquid with high viscosity may be selected, in consideration of requirements in subsequent processes or interaction with the hydrophilic coating.

Then in a step S5, the hydrophilic coating on surfaces other than the bottom 13 and both wall faces 12 of the gas flow groove 7 is removed. It should be noted that the hydrophilic coating on the top face 23 of the rib 11 is removed herein. A blasting method may be used in order to remove the hydrophilic coating. The blasting process may be either a known air blasting process or a shot blasting process. In the blasting process, metallic oxidized metal, resin or glass particles may be used with the radius and hardness thereof being selected as required. Thus, after the liquid or gel fills the gas flow groove 7, the hydrophilic membrane 14 is removed from areas not covered by the gel or the liquid by application of the blast process.

Finally the routine proceeds to a step S6, the gel or liquid filling the gas flow groove 7 is removed and the separator 4 is completed.

There is a grinding method by contact with the surface of the separator 4 in order to leave the hydrophilic membrane 14 only on the bottom 13 and both wall faces 13 of the gas flow groove 7 while removing the membrane 14 from other areas (corresponding to the steps S4–S5). Of the various known methods of grinding, there is a method of applying a roller-shaped grinding member reciprocally over the separator 4 on which the hydrophilic membrane 14 is formed. In this manner, it is possible to perform the surface processing without resulting in peeling of the hydrophilic membrane 14 on the bottom 13 or both wall faces 12 of the gas flow groove 7.

Figure 4A:
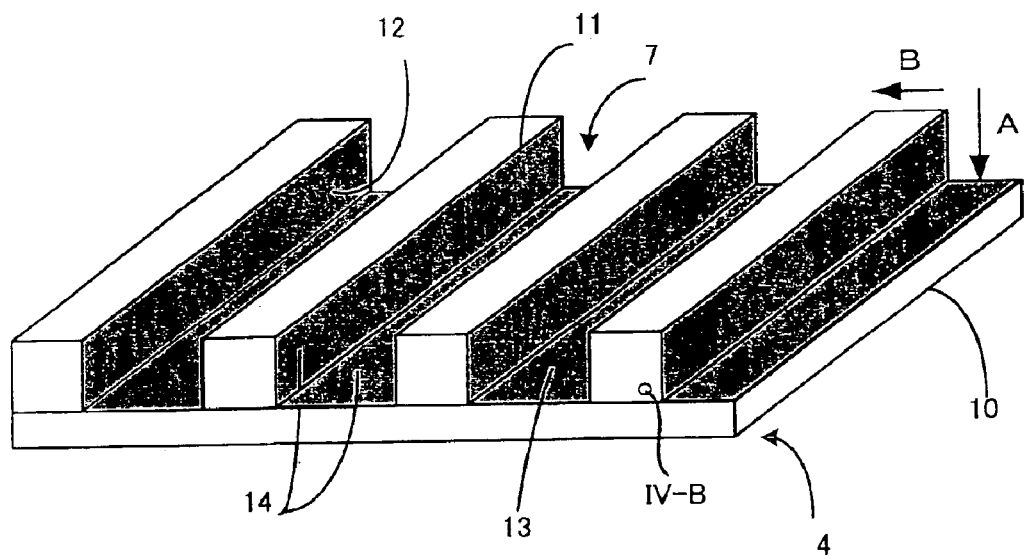
FIG. 4A is a schematic perspective view of a separator according to a second embodiment.

Referring to FIG. 4A, a separator 4 according to a second embodiment will be described. In FIG. 4A, the illustration of the cooling grooves is omitted. In the second embodiment, the rib 11 shown in FIG. 2 displays anisotropy with respect to the coefficient of thermal conductivity.

In order to prevent unintended diffusion of heat generated in proximity to the electrolytic membrane 2, the coefficient of thermal conductivity of the rib 11 (projection of the separator 4) with respect to the depth "A" of the gas flow groove 7 is smaller than the coefficient of thermal conductivity in the direction "B" which is orthogonal to the depth "A". Namely, the coefficient of thermal conductivity in a direction of a depth of the projection (rib 11) of the separator 4 is smaller than the coefficient of thermal conductivity in a direction orthogonal to the depth. The material constituting the rib 11 has anisotropy with respect to the coefficient of thermal conductivity in addition to several characteristics (including high electrical conductivity) required as a material for the separator.

The material for the rib 11 comprises plate-like graphite grains (or graphite flakes) obtained from application of a roller for pulverizing a block of graphite, natural graphite flakes, or a composite material from resin and anisotropic graphite flakes.

Figure 4B:
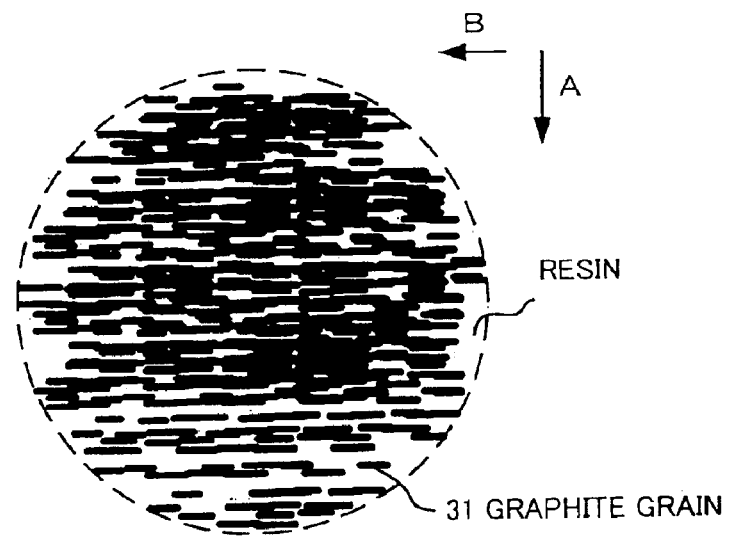
FIG. 4B is a schematic view of the microstructure of a rib of the separator in the detail area "IV-B" in FIG. 4A.

Graphite grains in plate form (or graphite flakes) have a high coefficient of thermal conductivity along the direction of the plate and a small coefficient of thermal conductivity along the direction orthogonal to the plate. For the purpose of forming a rib 11, anisotropic graphite flakes or a composite material comprising graphite flakes and resin may be processed by injection molding, compression molding or extrusion molding under a unidirectional pressure operation. In this manner, a rib 11, which displays anisotropy with respect to the coefficient of thermal conductivity, can be manufactured such that the graphite grains in plate form (or graphite flakes) in the rib 11 are oriented in a vertical direction "B" which is orthogonal to the depth "A". FIG. 4B shows schematically the microstructure of the rib 11 formed from a composite material comprising graphite grains 31 in plate form and resin, wherein the graphite grains 31 in plate form are oriented in the rib 11. The graphite grains in plate form (or graphite flakes) may be orientated in a vertical direction "B" by naturally piling up the graphite grains under gravity in resin melted during molding. Thus a rib 11 manufactured in this manner displays an anisotropic coefficient of thermal conductivity.

In the rib 11, it is preferred that the thermal conductivity with respect to depth "A" is 1/45 to 1/2 of the thermal conductivity in the vertical direction "B". If the ratio of the thermal conductivity with respect to depth "A" to the thermal conductivity in a vertical direction "B" is greater than 1/2, heat insulation performance is poor and heat generated by the MEA 20 diffuses. If the ratio is less than 1/45, the diffusion of heat with respect to depth "A" is extremely poor and as a result, there is the possibility of an adverse effect on the cooling performance of the cooling medium flowing in the cooling passages 9 during operation of the fuel cell stack 1.

After forming the separator 4 including the rib 11 of the above type, a hydrophilic membrane 14 is formed on the bottom 13 and both wall faces 12 of the gas flow groove 7 in the same manner as the first embodiment.

Use of a material displaying anisotropy with respect to the thermal conductivity for the rib 11 makes it possible to prevent diffusion of heat generated by the electrolytic membrane 2 with respect to the depth "A" of the separator 4 without adverse effects on the electrical conductive properties. Consequently the rib 11 according to the second embodiment enables rapid melting of frozen water at low temperatures.

The invention is illustrated in more detail by the following examples, which are illustrative of specific modes of practicing the invention and are not intended as limiting the scope of the invention.

EXAMPLES

Example I

EXAMPLE I corresponds to the first embodiment of the invention. The constituent material of the rib 11 is a composite material "M1" of resin and artificial graphite powder displaying low anisotropy but high porosity of 15%. The rib 11 displays a coefficient of thermal conductivity of 4.6 W/mK in a direction "B" orthogonal to the depth "A" and a coefficient of thermal conductivity of 5.2 W/mK with respect to the depth "A". The resistivity of the rib 11 is 15.8 Ω·cm in the vertical direction "B".

Example II

EXAMPLE II corresponds to the second embodiment of the invention. The constituent material of the rib 11 is a composite material "M2" of resin and expanded graphite powder in flake form displaying high anisotropy and low porosity of 3.2%. The rib 11 displays a coefficient of thermal conductivity of 125 W/mK in a direction "B" orthogonal to the depth "A" and a coefficient of thermal conductivity of 3.5 W/mK with respect to the depth "A". The resistivity of the rib 11 is 15.8 Ω·cm in the vertical direction "B".

Comparative Example I

The constituent material of the rib 11 is a composite material "M3" of resin and artificial graphite powder displaying low anisotropy and low porosity of 4.2%. The rib 11 displays a coefficient of thermal conductivity of 5.8 W/mK both in a direction of the depth "A" and in a direction "B" orthogonal to the depth "A". The resistivity in a direction "B" orthogonal to the depth "A" is 16 Ω·cm.

In EXAMPLE I, II and COMPARATIVE EXAMPLE I, the porosity was measured using a mercury porosimeter. The resistivity was measured using a four-probe method.

In EXAMPLE I, II and COMPARATIVE EXAMPLE I, the material of the plate 10 of the separator 4 is the composite material "M3". In EXAMPLE I, II, after the composite material "M3" is poured into a first section of the mold for shaping the separator 4 (the first section corresponds to the plate 10), the composite material "M1" or "M2" is poured into a second section of the mold for shaping the separator 4 (the second section corresponds to the rib 11). Thereupon a compressive molding operation is performed. In COMPARATIVE EXAMPLE I, the compression molding operation is performed after pouring the composite material "M3" into the entire region of the mold for shaping the separator 4. The size of the separator 4 is 100×100×3 mm with gas flow grooves 7 of a width of 2 mm, and a depth of 1.5 mm. The gas flow grooves 7 are disposed at intervals of 2 mm.

In EXAMPLE I, II and COMPARATIVE EXAMPLE I, the coating for forming the hydrophilic membrane 14 is a coating which includes carbon black, liquid phenol and polyvinyl alcohol all dissolved in methanol. The coating is performed by an air spray process and dried in order to form the hydrophilic membrane 14. The coating is dried at 50° C. for one hour using heated air and thereafter is allowed to dry for 12 hours at 70° C. After the coating is dried, the inlet/outlet of the gas flow groove 7 is closed and the gas flow groove 7 is filled with water. Thereafter a blasting process is applied to the top surface 23 of the separator 4 with an air pressure of 2.5 kg/cm$^2$ using aluminum particles with an average diameter of 350 μm.

In EXAMPLE I, II and COMPARATIVE EXAMPLE I, the gas diffusion layer in the electrodes (3a, 3b) is a carbon cloth with a thickness of 300 μm having a water repellent function.

Figure 5:
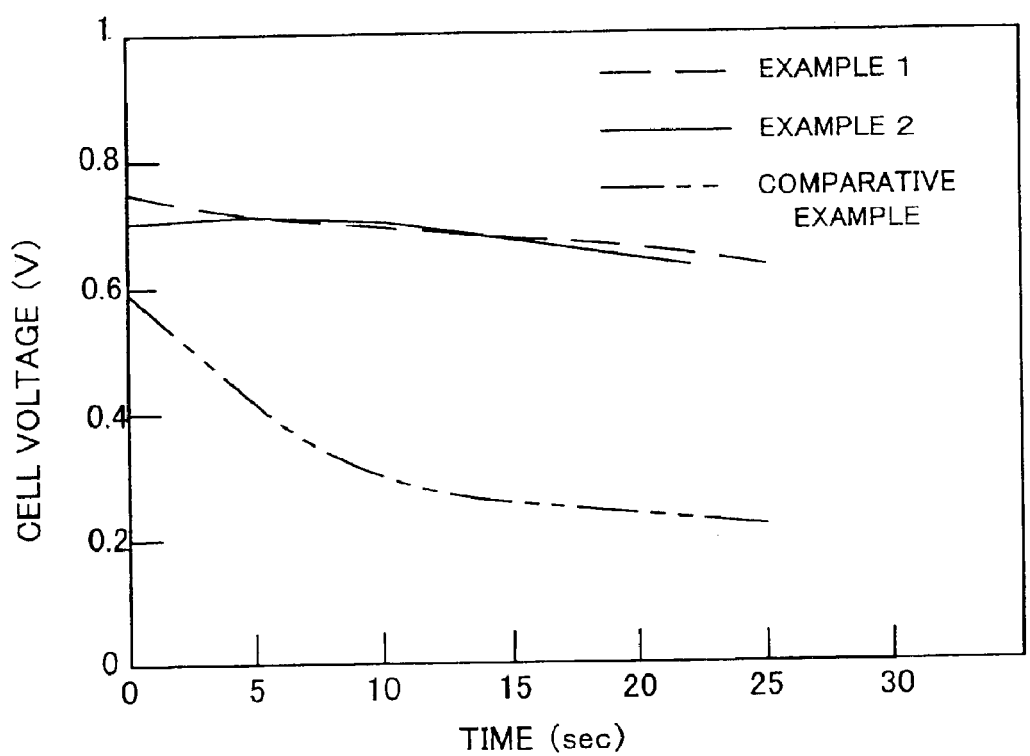
FIG. 5 is a graph of the startup characteristics of the fuel cell at low temperatures according to the first and second embodiments.

Referring to FIG. 5, the output voltage characteristics during startup after freezing of a fuel cell provided with a separator 4 will be described with reference to EXAMPLE I, II and COMPARATIVE EXAMPLE I. The experimental method of examining the output voltage characteristics of the fuel cell is described below.

Hydrogen and oxygen (not containing water vapor) are used as a fuel and an oxidizing agent for the fuel cell stack 1, respectively. A constant-current electronic load device is connected to the fuel cell stack 1 and the generated current is controlled to a fixed value. A thermo-couple for measuring temperature at a specific position is mounted about a specific cell 1a of the fuel cell stack 1.

Firstly at low temperatures, the fuel cell stack 1 generates power for a period of five seconds with a current density of 0.5 A/cm$^2$. In this manner, moisture is absorbed by the gas diffusion electrode (electrodes 3a, 3b). Thereafter the ambient temperature about the fuel cell is set at −5° C. The fuel cell stack 1 is left to cool until the detected internal temperature of the cell 1a reaches −2° C. Consequently, water absorbed in the gas diffusion electrode becomes frozen. The fuel cell stack 1 is then re-started in this state. The temporal variation in the output voltage during startup is recorded as the output voltage characteristics. The graph shown in FIG. 5 shows temporal variation in the cell voltage at a current density of 0.5 A/cm$^2$.

Referring to FIG. 5, a separator 4 according to COMPARATIVE EXAMPLE I using a conventional technique will be compared with a separator 4 according to EXAMPLE I or II. A fuel cell stack 1 using a separator 4 according to EXAMPLE I or II can maintain a high cell voltage for a long period of time in comparison with a fuel cell stack 1 using a separator 4 according to COMPARATIVE EXAMPLE I. In comparison with the fuel cell stack 1 using a separator 4 according to COMPARATIVE EXAMPLE I, the fuel cell stack 1 using a separator 4 according to EXAMPLE I or II generates a high cell voltage immediately after startup.

As a consequence, a fuel cell using a separator according to this invention displays excellent startup characteristics even when the fuel cell has cooled to a low temperature of less than zero ° C.

The entire contents of Japanese Patent Application P2001-299500 (filed Sep. 28, 2001) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A separator for a fuel cell, the fuel cell having two separators and a membrane electrode assembly being sandwiched by the two separators, the membrane electrode assembly being provided with an anode electrode, a cathode electrode and an electrolytic membrane sandwiched by the two electrodes, each of the two electrodes having a diffusion layer allowing diffusion of one of a gaseous oxidizing agent and fuel gas; the separator comprising:
   a plate-like member; and
   a plurality of projections for forming a plurality of gas passages which allow flow of one of the gaseous oxidizing agent and fuel gas, the projections being provided on the plate-like member and making contact with the membrane electrode assembly, one of the gas passages being defined by two adjacent projections, the plate-like member and the membrane electrode assembly;
   wherein a coefficient of thermal conductivity of the projection is smaller than a coefficient of thermal conductivity of the plate-like member of the separator; and
   wherein in the projections, the coefficient of thermal conductivity in a direction of a depth of the projection is smaller than the coefficient of thermal conductivity in a direction orthogonal to the depth.

2. The separator for a fuel cell as defined in claim 1, wherein a coefficient of thermal conductivity of a material forming the projection is smaller than a coefficient of thermal conductivity of a material forming the plate-like member of the separator.

3. The separator for a fuel cell as defined in claim 2, wherein the porosity of the material forming the projection is greater than the porosity of the material forming the plate-like member of the separator.

4. The separator for a fuel cell as defined in claim 3, wherein the material forming the projection has a porosity between 10% to 80%.

5. The separator for a fuel cell as defined in claim 1, wherein the coefficient of thermal conductivity in a direction of the depth of the projection is 1/45 to 1/2 of the coefficient of thermal conductivity in a direction orthogonal to the depth.

6. The separator for a fuel cell as defined in claim 1, wherein the material forming the projection contains plate-like graphite grains oriented in a direction orthogonal to a depth of the projection.

7. A separator for a fuel cell, the fuel cell having two separators and a membrane electrode assembly being sandwiched by the two separators, the membrane electrode assembly being provided with an anode electrode, a cathode electrode and an electrolytic membrane sandwiched by the two electrodes, each of the two electrodes having a diffusion layer allowing diffusion of one of a gaseous oxidizing agent and fuel gas; the separator comprising:
   a plate-like member; and
   a plurality of projections for forming a plurality of gas passages which allow flow of one of the gaseous oxidizing agent and fuel gas, the projections being provided on the plate-like member and making contact with the membrane electrode assembly, one of the gas passages being defined by two adjacent projections, the plate-like member and the membrane electrode assembly;
   wherein a coefficient of thermal conductivity of the projection is smaller than a coefficient of thermal conductivity of the plate-like member of the separator; and
   wherein only bottom face and both wall faces of the gas passage are covered by a membrane displaying hydrophilic characteristics, wherein the bottom face and the wall faces is included in a surface of the separator.

8. A method of manufacturing a separator for a fuel cell, the fuel cell having the separator provided with a plate-like member and a plurality of projections on the plate-like member, the projections making contact with an electrode of the fuel cell, wherein a gas flow groove is formed between two adjacent projections and extends parallel to a surface of the separator;
   the method of manufacture comprising:
   forming the projections from a material having a lower coefficient of thermal conductivity than a coefficient of thermal conductivity of the plate-like member;
   forming a membrane from a hydrophilic electrically-conductive coating applied to the surface of the projections and the surface of the plate-like member; and
   removing the membrane from a top of the projections which makes contact with the electrode of the fuel cell by grinding the surface on the top of the projections or by applying a blasting process after filling the gas flow groove with a liquid medium or a gel medium.

9. A fuel cell comprising:
   a membrane electrode assembly comprising an electrolytic membrane, and an anode electrode and a cathode electrode sandwiching the electrolytic membrane, the anode electrode and the cathode electrode formed from a porous material allowing diffusion of gas;
   two separators for supporting and sandwiching the membrane electrode assembly, each of the separators having a plate-like member and a plurality of projections projected from the plate-like member for defining a plurality of gas flow grooves on the surface of the plate-like member; the gas flow grooves allowing flow of one of a fuel gas and a gaseous oxidizing agent;
   wherein in the separators, a coefficient of thermal conductivity of the projections is smaller than a coefficient of thermal conductivity of the plate-like member; and
   wherein the projections, the coefficient of thermal conductivity in a direction of a depth of the projection is smaller than the coefficient of thermal conductivity in a direction orthogonal to the depth.

* * * * *